United States Patent
Deshpande et al.

(10) Patent No.: US 9,977,750 B2
(45) Date of Patent: May 22, 2018

(54) COHERENT MEMORY INTERLEAVING WITH UNIFORM LATENCY

(71) Applicant: FREESCALE SEMICONDUCTOR, INC., Austin, TX (US)

(72) Inventors: Sanjay R. Deshpande, Austin, TX (US); John E. Larson, Round Rock, TX (US)

(73) Assignee: NXP USA, Inc., Austin, TX (US)

( * ) Notice: Subject to any disclaimer, the term of this patent is extended or adjusted under 35 U.S.C. 154(b) by 509 days.

(21) Appl. No.: 14/568,433

(22) Filed: Dec. 12, 2014

(65) Prior Publication Data

US 2016/0170916 A1 Jun. 16, 2016

(51) Int. Cl.
*G06F 13/00* (2006.01)
*G06F 13/16* (2006.01)
*G06F 13/40* (2006.01)
*G06F 12/0831* (2016.01)
*H04L 12/933* (2013.01)

(52) U.S. Cl.
CPC ........ *G06F 13/161* (2013.01); *G06F 12/0833* (2013.01); *G06F 13/1684* (2013.01); *G06F 13/4022* (2013.01); *G06F 2212/1024* (2013.01); *G06F 2212/621* (2013.01); *H04L 49/101* (2013.01)

(58) Field of Classification Search
None
See application file for complete search history.

(56) References Cited

U.S. PATENT DOCUMENTS

| | | | | |
|---|---|---|---|---|
| 5,577,204 A * | 11/1996 | Brewer | ............... | G06F 13/1657 710/317 |
| 6,636,906 B1 * | 10/2003 | Sharma | ............... | G06F 12/0835 710/22 |
| 2001/0034815 A1* | 10/2001 | Dugan | ................ | G06F 11/1012 711/118 |
| 2002/0181395 A1* | 12/2002 | Foster | ................... | H04L 49/357 370/229 |
| 2003/0163649 A1* | 8/2003 | Kapur | ................. | G06F 12/0813 711/146 |
| 2003/0167348 A1* | 9/2003 | Greenblat | ............... | H04L 12/42 709/251 |
| 2007/0217436 A1* | 9/2007 | Markley | ............. | H04L 12/2803 370/401 |

(Continued)

OTHER PUBLICATIONS

Chao, A., "Using Multichannel DRAM Subsystems to Create Scalable Architecture for Video SOCs", 4th Annual Multicore Expo, Sonics Inc., Mar. 18, 2009, pp. 1-20.

*Primary Examiner* — Michael Sun

(57) ABSTRACT

A data processing system includes a network of interconnected switch points having a plurality of edge switch points located at an edge of the network; a plurality of network interface controllers, wherein each edge switch point of the plurality of edge points is coupled to a corresponding network interface controller of the plurality of network interface controllers; a plurality of target controllers; and a crossbar switch coupled between the plurality of network interface controllers and the plurality of target controllers. The crossbar switch is configured to communicate read/write signals between any one of the plurality of network interface controllers and any one of the plurality of target controllers.

20 Claims, 1 Drawing Sheet

(56) References Cited

U.S. PATENT DOCUMENTS

| | | | | |
|---|---|---|---|---|
| 2010/0180318 A1* | 7/2010 | Salowey | .................. | H04L 63/20 |
| | | | | 726/1 |
| 2012/0170585 A1* | 7/2012 | Mehra | ..................... | H04L 45/24 |
| | | | | 370/400 |
| 2013/0304841 A1* | 11/2013 | Hummel | ............. | G06F 15/1735 |
| | | | | 709/212 |
| 2016/0092362 A1* | 3/2016 | Barron | ................ | G06F 12/0835 |
| | | | | 710/308 |

* cited by examiner

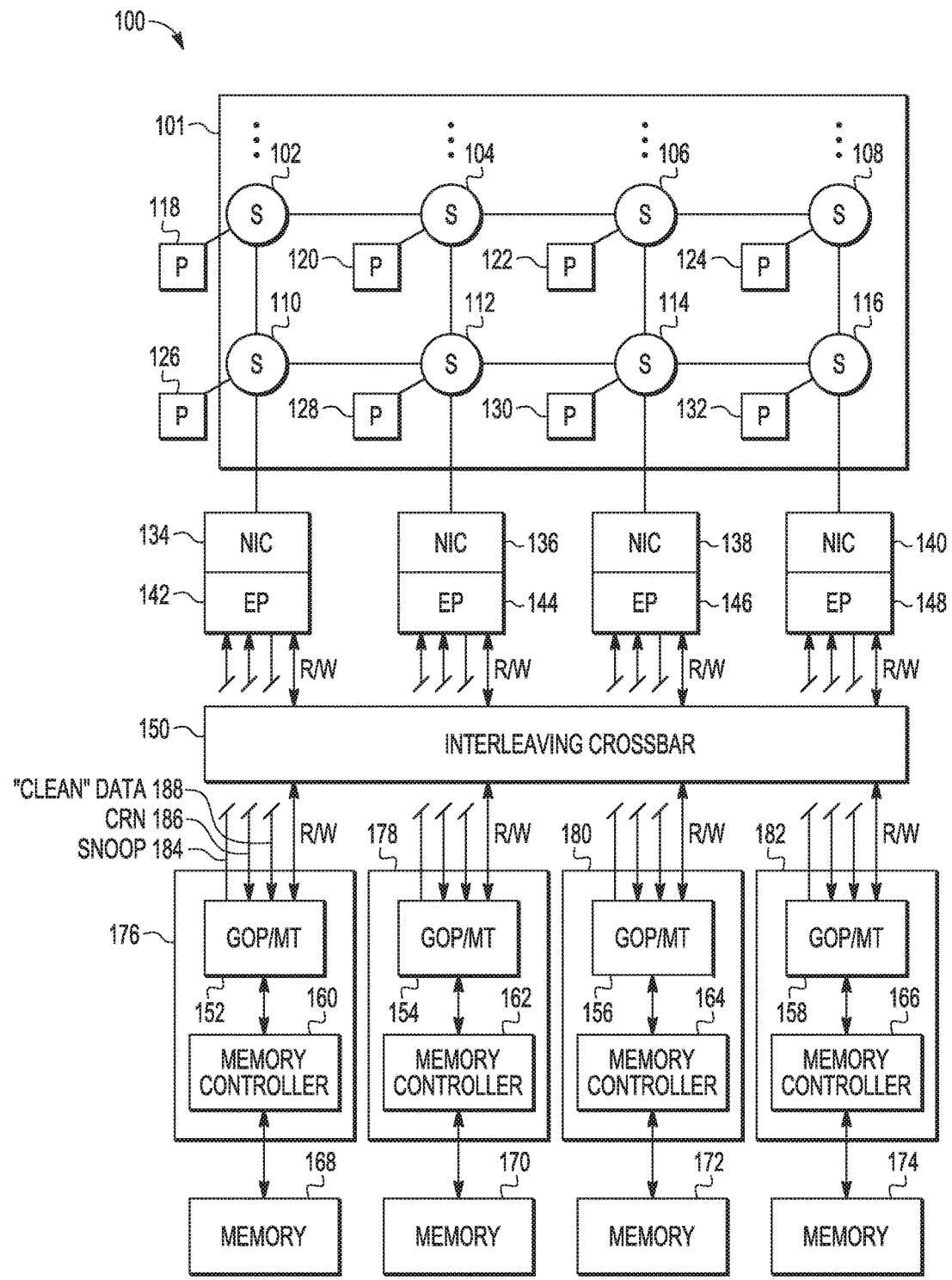

COHERENT MEMORY INTERLEAVING WITH UNIFORM LATENCY

BACKGROUND

Field of the Disclosure

The present disclosure relates in general to semiconductor memories, and more specifically to coherent memory interleaving with uniform latency.

Description of the Related Art

Memory interleaving refers to distributing accesses made by programs uniformly across multiple available memory devices in order to achieve higher memory throughput while still maintaining lower latencies by attempting to hide delays between consecutive accesses to a single device. Ultimately, memory interleaving improves the performance of applications running in the system and relieves programs of the worry about optimizing data placement in memories.

The effectiveness of interleaving depends on whether accesses to different memory devices have the same or similar latency. If there is significant basic inequality between their access times, then the intended benefit is lost. In that case one might just as well just access the device with the lowest native latency.

Many connectivity topologies for large computer systems inherently present large inequality of path-lengths to different memory devices connected within them. The differences in latency makes access times non-uniform, which undermines the usefulness of interleaving.

BRIEF DESCRIPTION OF THE DRAWINGS

The benefits, features, and advantages of the present disclosure will become better understood with regard to the following description, and accompanying drawings where:

FIG. 1 is a schematic diagram of a processing network according to an embodiment.

DETAILED DESCRIPTION

Embodiments disclosed herein that provide equal access times to different memory devices without significantly impacting latencies. Interleaving among multiple memory controllers or channels is achieved while maintaining coherency and uniform latencies to the interleaved memory devices using system topologies that nominally do not offer uniform memory access pathways.

FIG. 1 is a schematic diagram of a processing network 100 according to an embodiment of the present invention that includes a network 101, such as a mesh network or other suitable network) of switch points 102-116 arranged in a two-dimensional grid or array pattern. Each switch point 102-116 is coupled to communicate with the other switch points 102-116, either directly or indirectly, using a communication protocol such as the International Standards Organization's (ISO) Transmission Control Protocol (TCP) or other suitable protocol that specifies how data should be packetized, addressed, transmitted, routed and received. As an example, switch point 102 can be configured to use the TCP to transfer packets directly to switch points 104 and 110, and indirectly to switch points 106, 108, 112, 114 and 116 via switch points 104 and 110.

Switch points 102-116 are further coupled to transmit and receive packets with a respective one of processing devices 118-132 using a suitable communication protocol, such as TCP. Processing devices 118-132 can issue requests for data from interleaved memory devices 168-174 through a respective one of switch points 102-116. The requests and responses may be routed column-wise through the network of switch points 102-116. For example, a request from processor 118 can be routed through switch point 102 to switch point 110. A request from processor 120 can be routed through switch point 104 to switch point 112, and so on. The requests typically specify an address of the data within memory device 168-174. Data can be sorted or hashed among memory devices 168-174 by address. For example, the last few numbers of each address can be used to determine which memory device 168-174 stores the data. When data is interleaved, memory addresses can be accessed sequentially in memory devices 168-174, i.e., a first memory address can be in memory device 168, the second address can be in memory device 170, the third address can be in memory device 172, etc. When multiple sequential addresses are accessed, each memory device 168-174 can work on gathering a portion of the requested data simultaneously to reduce the amount of time it would otherwise take to gather all of the data from one of memory devices 168-174 sequentially. For simultaneous memory accesses within a cacheline, the address for a single cacheline can reside within a single memory controller 160-166. Multiple cacheline requests can be interleaved across multiple memory controllers 160-166 hashed by the address. Each memory controller 160-166 can then uniquely operate on its own hashed memory addresses fetching a cacheline worth of data.

Switch points 110-116 at the edge of the network 101 are each coupled to a respective network interface controller (NIC) 134-140. NICs 134-140 translate the message packets from a data layer to a coherency layer using a coherency protocol, and vice versa, depending on whether the message is incoming or outgoing. Routing information can also be added to the message packets in NICs 134-140.

Memory devices 168-174 can be any suitable memory devices such as, for example, Random Access Memory (RAM), Static RAM (SRAM), Magnetoresistive RAM (MRAM), Nonvolatile RAM (NVRAM, such as "FLASH" memory, etc.), and/or Dynamic RAM (DRAM) such as Synchronous DRAM (SDRAM), Double Data Rate RAM, Erasable Programmable ROM (EPROM), an Electrically Erasable Programmable ROM (EEPROM), etc., among others.

End points 142-148 are coupled to communicate with NICs 134-140 and interleaving crossbar 150. End points 142-148 performs a hash process on the memory address for each request to determine which memory device 168-174 to use to access the data. Any suitable hash process can be used in end points 142-148. Processors 118-132 issue requests to interleaved memory devices 168-174 through one or more switch points 102-116 along a column corresponding to the switch point 102-116 to which the processor 118-132 is connected regardless of the particular address within the range that is interleaved. This way, all such accesses within the range of addresses from processor 118-132 experience the same path length inside interleaving crossbar 150.

Interleaving crossbar 150 receives read and write requests from end points 142-148 and routes the request to the specified global ordering point (GOP) and memory target modules 152-158. Crossbar 150 also transmits data from memory devices 168-174 to end points 142-148 via a respective GOP and memory target modules 152-158. Crossbar 150 can use hashed addresses to route requests and is capable of interleaving the requests among multiple memory devices 168-174. Thus, routing requests through crossbar 150 results in approximately the same latency among all interleaved read/write requests, which helps realize the benefits of interleaving as requests may be evenly distributed among memory devices 168-174.

GOP and memory target modules 152-158 are coupled to communicate bi-directionally with a respective one of memory controllers 160-166. Memory controllers 160-166 are coupled to communicate bi-directionally with a respective one of memory devices 168-174. The memory target portion of each GOP and memory target module 152-158 communicates requests and receives responses directly from a respective one of memory controllers 160-166. The combination of each GOP and memory target module 152-158 and the corresponding memory controller 160-166 is referred to herein as a controller or control logic unit 176-182.

Processors 118-132 include one or more levels of cache memory that stores a subset of duplicative information that is stored in memory devices 168-174. Using a cache may reduce the number of occurrences that processors 118-132 must communicate with the memory devices 168-174 via interleaving crossbar 150. However, the presence of various caches (or other memory devices) in system 100 can readily permit a data operand which has the same identifier or address to be present at various locations in system 100. When the data operand is modified in one part of system 100, an opportunity exists that an old version of the data operand will be stored or used. Memory coherency refers to the need of each processor 118-132 in system 100 to have access to the most recently modified data corresponding to a particular address in the memory devices 168-174. The presence of differing data values for a same address value in system 100 may lead to erroneous results being output by processors 118-132.

To maintain memory coherency, reads and writes of information to memory devices 168-174 are monitored or "snooped". When either a memory read or a memory write of data at an address is detected, this address of the transaction is used as a snoop address. A snoop request is initiated and directed to all caches in system 100 such that snoop lookups can be performed to search for any address in the caches that match the snoop address. A snoop hit occurs for every match, and any needed corrective action is taken to maintain coherency of the data at the address in the cache where the snoop hit occurs. Coherency of information utilized by the processors 118-132 can be maintained in accordance with, for example, the MESI (Modified-Exclusive-Shared-Invalid) protocol.

To control the address buffer entries/data buffer entries among different requests, memory controllers 160-166 coupled to GOP and memory target modules 152-158 may implement a credit system. GOP and memory target modules 152-158 include logic to buffer transactions sent by requesters, and to buffer snoop credits issued by a target memory device 168-174.

Each request type may be allocated a certain number of credits (where each credit represents one address buffer entry and corresponding data buffer entry, if applicable). The total number of credits may not exceed the total number of entries. When a buffer entry is allocated to a request, a credit is consumed and when the buffer entry is freed via completion of a request, the credit is returned. The credits can include request credits corresponding to a request queue and snoop credits for snoop requests. If a snoop credit is available from a target memory device 168-174, GOP and memory target modules 152-158 arbitrate between the transactions and select one at a time to snoop. Each transaction so selected consumes a snoop credit. GOP and memory target modules 152-158 can also perform a snoop broadcast for the selected transaction to the snoopers in network 100, and attach a write data buffer credit to a snoop, if one is outstanding, and indicate its dispatch to the target.

Signals used to maintain coherency in system 100 may be communicated between each GOP and memory target module 152-158 and a respective one of switch points 110-116 on the edge of mesh network 101 outside of interleaving crossbar 150. For example, a snoop bus 184 can be included to transmit accesses to be snooped to a selected set of cache memories used by processors 118-132. As another example, a coherency response connection 186 can be coupled between each GOP and memory target module 152-158 and a respective switch point 110-116. In response to processing a memory transaction request for a memory location, each processor 118-132 can report compliance with the coherency requirements of the memory transaction request to a respective GOP and memory target module 152-158 via a respective coherency response connection 186. As a further example of a signal path that can be used to maintain memory coherency, clean data paths 188 can be coupled between each GOP and memory target module 152-158 and a respective switch point 110-116 to move coherent or "clean" data to memory in processors 118-132 in compliance with the coherency protocol being used.

The coherency action is carried out via the switch point 102-116 that received the snoop request and can be routed to all cache memories using data at a specified address via the receiving switch point 102-116. If there is intervention, a snooper responds to a request for data and sources the data rather than allowing the data to be sourced from one of memory devices 166-174 to which the request was addressed. The requesting processor 118-132 receives the data directly from the snooper supplying the data. If the data is to be provided by memory devices 168-174, GOP and memory target module 152-158 sends the response via the interleaving crossbar 150 back to the switch point 102-116 from where the original request arrived. Again, the response path has the same length regardless of the specific GOP and memory target module 152-158 that returns the data.

By now it should be appreciated that in some embodiments, a data processing system (100) can comprise a network of interconnected switch points (102-116) having a plurality of edge switch points (110-116) located at an edge of the network and a plurality of network interface controllers (134-140). Each edge switch point of the plurality of edge points can be coupled to a corresponding network interface controller of the plurality of network interface controllers. A crossbar switch (150) can be coupled between the plurality of network interface controllers and the plurality of target controllers (152/160, 154/162, 156/164, 158/166). The crossbar switch can be configured to communicate read/write signals (R/W) between any one of the plurality of network interface controllers and any one of the plurality of target controllers.

In another aspect, the read/write signals communicated by the crossbar switch can comprise read/write access requests and corresponding read/write data.

In another aspect, all read/write access requests directed to any target controller of the plurality of target controllers generated by a processing unit at a first switch point of the network are transmitted through a same path of switch points from the first switch point to a first edge switch point of the plurality of edge switch points.

In another aspect, a first read/write access request generated by the processing unit at the first switch point and transmitted to the first edge switch point is communicated to a first target controller of the plurality of target controllers through the crossbar switch, and a second read/write access request generated by the processing unit at the first switch point and transmitted to the first edge switch point is communicated to a second target controller of the plurality of target controllers through the crossbar switch.

In another aspect, the data processing system can further comprise a snoop interconnect between each network interface controller and a corresponding target controller of the plurality of target controllers, wherein the snoop interconnect is configured to communicate snoop messages outside the crossbar switch.

In another aspect, the snoop messages are communicated between each network interface controller and a snoop network.

In another aspect, the data processing system can further comprise a coherency response interconnect between each network interface controller and the corresponding target controller, wherein the coherency response interconnect is configured to communicate coherency responses outside the crossbar switch.

In another aspect, the coherency responses are communicated between each network interface and a coherency response network.

In another aspect, each target controller comprises a global ordering point (152-158) and a memory controller (160-166), wherein the global ordering point is configured to determine an order of memory accesses performed by the memory controller.

In another aspect, the data processing system can further comprise a memory (160, 162, 164, or 166) coupled to a memory controller of a target controller of the plurality of target controllers.

In another aspect, the data processing system can further comprise a memory (160-166) coupled to each memory controller.

In a data processing system having a network of interconnected switch points (102-116), wherein the network includes a plurality of edge switch points (110-116) located at an edge of the network, an embodiment of a method can comprise generating, by a first processing unit coupled to a first switch point of the network, a first read/write access request; transmitting the first read/write access request through a first path of the network to a first edge switch point; determining a first destination target controller of the first read/write access request; and transmitting the first read/write access request through a crossbar switch (150) from the first edge switch point to the first destination target controller.

In another aspect, the first path of the network comprises one or more switch points of the network.

In another aspect, the method can further comprise generating, by the first processing unit coupled to the first switch point of the network, a second read/write access request having a different destination than the first read/write access request; transmitting the second read/write access request through the first path of the network to the first edge switch point; determining a second destination target controller of the second read/write access request, wherein the second destination target controller is different from the first target controller; and transmitting the second read/write access request through the crossbar switch from the first edge switch point to the second destination target controller.

In another aspect, the method can further comprise providing a snoop message from the first destination target controller to the first edge switch point without transmitting the snoop message through the crossbar switch; and providing the snoop message from the first edge switch point to a snoop network of the data processing system.

In another aspect, the method can further comprise receiving, at the first edge switch point, a coherency response to the first read/write access from a coherency response network of the data processing system; and providing the coherency response to the first destination target controller without transmitting the coherency response through the crossbar switch.

In another aspect, the method can further comprise transmitting read/write data corresponding to the first read/write access request between the first switch point and the first edge switch point, wherein the read/write data is transmitted along the first path; and transmitting the read/write data through the crossbar switch between the first edge switch point and the destination target controller.

In another aspect, the method can further comprise, when the first read/write access request is a write request, providing the read/write data to a first memory coupled to the first destination target controller; and when the first read/write access request is a read request, receiving the read/write data from the first memory.

In another embodiment, a data processing system can comprise a network of interconnected switch points having a plurality of edge switch points located at an edge of the network, and a plurality of network interface controllers. Each edge switch point of the plurality of edge points can be coupled to a corresponding network interface controller of the plurality of network interface controllers. A crossbar switch can be coupled between the plurality of network interface controllers and the plurality of target controllers. The crossbar switch can be configured to communicate read/write signals between any one of the plurality of network interface controllers and any one of the plurality of target controllers. A snoop bus can be coupled between each network interface controller and a corresponding target controller of the plurality of target controllers.

In another aspect, the data processing system can further comprise a coherency response bus coupled between each network interface controller and the corresponding target controller.

This disclosure is presented to enable one of ordinary skill in the art to make and use the present disclosure as provided within the context of a particular application and its requirements. Various modifications to the preferred embodiments will, however, be apparent to one skilled in the art, and the general principles defined herein may be applied to other embodiments. Therefore, the present disclosure is not intended to be limited to the particular embodiments shown and described herein, but is to be accorded the widest scope consistent with the principles and novel features herein disclosed.

Processing system or network 100 can be implemented in one or more Systems-On-Chip (SoC), Application Specific Integrated Circuit (ASIC), Digital Signal Processor (DSP), Field-Programmable Gate Array (FPGA), processor, microprocessor, controller, a microcontroller (MCU), Graphics Processing Unit (GPU), or the like. Additionally or alternatively, processing network 100 may include one or more mixed-signal or analog circuits, such as, for example, Analog-to-Digital Converter (ADCs), Digital-to-Analog Converter (DACs), Phased Locked Loop (PLLs), oscillators, filters, amplifiers, etc. Additionally or alternatively, processing network 100 may include one or more Micro-Electro-Mechanical Systems (MEMS), Nano-ElectroMechanical Systems (NEMS), or the like.

In one embodiment, processors 118-132 are computer systems which may be designed to give independent computing power to one or more users. Computer systems may be found in many forms including but not limited to mainframes, minicomputers, servers, workstations, personal computers, notepads, tablets, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A computer process typically includes an executing (running) program or portion of a program, current program values and state information, and the resources used by the operating system to manage the execution of the process.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of systems disclosed herein are circuitry located on a single integrated circuit or within a same device. Alternatively, the systems may include any number of separate integrated circuits or separate devices interconnected with each other. Also for example, a system or portions thereof may be soft or code representations of physical circuitry or of logical representations convertible into physical circuitry. As such, a system may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the invention(s) is/are described herein with reference to specific embodiments, various modifications and changes can be made without departing from the scope of the present invention(s), as set forth in the claims below. Accordingly, the specification and FIGURES are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The term "coupled" is defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A data processing system, comprising:
   a network of interconnected switch points having a plurality of edge switch points located at an edge of the network;
   a plurality of network interface controllers, wherein each edge switch point of the plurality of edge points is coupled to a corresponding network interface controller of the plurality of network interface controllers;
   a plurality of target memory controllers; and
   a crossbar switch coupled between the plurality of network interface controllers and the plurality of target memory controllers, wherein the crossbar switch is configured to communicate read/write signals between any one of the plurality of network interface controllers and any one of the plurality of target memory controllers, wherein the plurality of network interface controllers are coupled between the plurality of edge switch points and the crossbar switch.

2. The data processing system of claim 1, wherein the read/write signals communicated by the crossbar switch comprise read/write access requests and corresponding read/write data.

3. The data processing system of claim 2, wherein all read/write access requests directed to any target memory controller of the plurality of target memory controllers generated by a processing unit at a first switch point of the network are transmitted through a same path of switch points from the first switch point to a first edge switch point of the plurality of edge switch points.

4. The data processing system of claim 3, wherein a first read/write access request generated by the processing unit at the first switch point and transmitted to the first edge switch point is communicated to a first target memory controller of the plurality of target memory controllers through the crossbar switch, and a second read/write access request generated by the processing unit at the first switch point and transmitted to the first edge switch point is communicated to a second target memory controller of the plurality of target memory controllers through the crossbar switch.

5. The data processing system of claim 1, further comprising a snoop interconnect between each network interface controller and a corresponding target memory controller of the plurality of target memory controllers, wherein the snoop interconnect is configured to communicate snoop messages outside the crossbar switch.

6. The data processing system of claim 5, wherein the snoop messages are communicated between each network interface controller and a snoop network.

7. The data processing system of claim 1, further comprising a coherency response interconnect between each network interface controller and the corresponding target memory controller, wherein the coherency response interconnect is configured to communicate coherency responses outside the crossbar switch.

8. The data processing system of claim 7, wherein the coherency responses are communicated between each network interface and a coherency response network.

9. The data processing system of claim 1, wherein each target memory controller of the plurality of target memory controllers comprises a global ordering point and a memory controller, wherein the global ordering point is configured to determine an order of memory accesses performed by the memory controller.

10. The data processing system of claim 9, further comprising a memory coupled to a memory controller of a target memory controller of the plurality of target memory controllers.

11. The data processing system of claim 9, further comprising a memory coupled to each memory controller.

12. A method comprising:
generating a first read/write access request by a first processing unit coupled to a first switch point of a network of interconnected switch points in a data processing system, wherein the network includes a plurality of edge switch points located at an edge of the network;
transmitting the first read/write access request through a first path of the network to a first edge switch point via a second switch point of the network of interconnected switch points, the second switch point is not at the edge of the network;
determining a first destination target memory controller of the first read/write access request; and
transmitting the first read/write access request through a crossbar switch from the first edge switch point to the first destination target memory controller.

13. The method of claim 12, wherein the first path of the network comprises one or more switch points of the network.

14. The method of claim 12, further comprising:
generating, by the first processing unit coupled to the first switch point of the network, a second read/write access request having a different destination than the first read/write access request;
transmitting the second read/write access request through the first path of the network to the first edge switch point;
determining a second destination target memory controller of the second read/write access request, wherein the second destination target memory controller is different from the first target memory controller; and
transmitting the second read/write access request through the crossbar switch from the first edge switch point to the second destination target memory controller.

15. The method of claim 12, further comprising:
providing a snoop message from the first destination target memory controller to the first edge switch point without transmitting the snoop message through the crossbar switch; and
providing the snoop message from the first edge switch point to a snoop network of the data processing system.

16. The method of claim 15, further comprising:
receiving, at the first edge switch point, a coherency response to the first read/write access from a coherency response network of the of the data processing system; and
providing the coherency response to the first destination target memory controller without transmitting the coherency response through the crossbar switch.

17. The method of claim 12, further comprising:
transmitting read/write data corresponding to the first read/write access request between the first switch point and the first edge switch point, wherein the read/write data is transmitted along the first path; and
transmitting the read/write data through the crossbar switch between the first edge switch point and the destination target memory controller.

18. The method of claim 17, further comprising:
when the first read/write access request is a write request, providing the read/write data to a first memory coupled to the first destination target memory controller; and
when the first read/write access request is a read request, receiving the read/write data from the first memory.

19. A data processing system, comprising:
a network of interconnected switch points having a plurality of edge switch points located at an edge of the network;
a plurality of network interface controllers, wherein each edge switch point of the plurality of edge points is coupled to a corresponding network interface controller of the plurality of network interface controllers;
a plurality of target memory controllers;
a crossbar switch coupled between the plurality of network interface controllers and the plurality of target memory controllers, wherein the crossbar switch is configured to communicate read/write signals between any one of the plurality of network interface controllers and any one of the plurality of target memory controllers, wherein the plurality of network interface controllers are coupled between the plurality of edge switch points and the crossbar switch; and
a snoop bus coupled between each network interface controller and a corresponding target memory controller of the plurality of target memory controllers.

20. The data processing system of claim 19, further comprising:
a coherency response bus coupled between each network interface controller and the corresponding target memory controller.

* * * * *